United States Patent
Williams et al.

(10) Patent No.: US 11,777,729 B2
(45) Date of Patent: Oct. 3, 2023

(54) SECURE ANALYTICS USING TERM GENERATION AND HOMOMORPHIC ENCRYPTION

(71) Applicant: Enveil, Inc., Fulton, MD (US)

(72) Inventors: Ellison Anne Williams, Fulton, MD (US); Ryan Carr, Fulton, MD (US)

(73) Assignee: Enveil, Inc., Fulton, MD (US)

( * ) Notice: Subject to any disclaimer, the term of this patent is extended or adjusted under 35 U.S.C. 154(b) by 59 days.

(21) Appl. No.: 17/478,789

(22) Filed: Sep. 17, 2021

(65) Prior Publication Data
US 2022/0006629 A1     Jan. 6, 2022

Related U.S. Application Data (63) Continuation-in-part of application No. 16/158,230, filed on Oct. 11, 2018, now Pat. No. 11,507,683, (Continued)

(51) Int. Cl.
*H04L 29/00* (2006.01)
*H04L 9/30* (2006.01)
(Continued)

(52) U.S. Cl.
CPC .............. *H04L 9/30* (2013.01); *G06F 16/901* (2019.01); *G06F 16/909* (2019.01); *H04L 9/008* (2013.01); *H04L 9/3236* (2013.01)

(58) Field of Classification Search
CPC ......... H04L 9/30; H04L 9/008; H04L 9/3236; G06F 16/909; G06F 16/901
(Continued)

(56) References Cited

U.S. PATENT DOCUMENTS 5,732,390 A    3/1998    Katayanagi et al.
6,178,435 B1    1/2001    Schmookler
(Continued)

FOREIGN PATENT DOCUMENTS

EP    2887607 A1    6/2015
EP    2873186 B1    3/2018
(Continued)

OTHER PUBLICATIONS

"International Search Report" and "Written Opinion of the International Searching Authority," Patent Cooperation Treaty Application No. PCT/US2018/014535, dated Apr. 19, 2018, 9 pages.
(Continued)

*Primary Examiner* — Jeffrey C Pwu
*Assistant Examiner* — Michael D Anderson
(74) *Attorney, Agent, or Firm* — Carr & Ferrell LLP (57) ABSTRACT

Provided are methods and systems for performing secure analytics using term generations and a homomorphic encryption. An example method includes receiving, by at least one server from a client, a term generation function, a hash function, a public key of a homomorphic encryption scheme, and a homomorphically encrypted list of indices, wherein the list of indices is generated using the term generation function and the hash function, applying, by the server, the term generation function, the hash function, and the public key to a data set to determine a further homomorphically encrypted list of indices, extracting, by the server and using the homomorphically encrypted list of indices and the further homomorphically encrypted list of indices, data from the encrypted data set to obtain an encrypted result, and sending the encrypted result to the client to decrypt the encrypted result using a private key of the homomorphic encryption scheme.

24 Claims, 7 Drawing Sheets

Related U.S. Application Data which is a continuation-in-part of application No. 15/875,914, filed on Jan. 19, 2018, now Pat. No. 10,903,976.

(60) Provisional application No. 62/462,818, filed on Feb. 23, 2017, provisional application No. 62/448,883, filed on Jan. 20, 2017, provisional application No. 62/448,908, filed on Jan. 20, 2017, provisional application No. 62/448,896, filed on Jan. 20, 2017, provisional application No. 62/448,893, filed on Jan. 20, 2017, provisional application No. 62/448,890, filed on Jan. 20, 2017, provisional application No. 62/448,918, filed on Jan. 20, 2017, provisional application No. 62/448,902, filed on Jan. 20, 2017, provisional application No. 62/448,916, filed on Jan. 20, 2017, provisional application No. 62/448,913, filed on Jan. 20, 2017, provisional application No. 62/448,899, filed on Jan. 20, 2017, provisional application No. 62/448,906, filed on Jan. 20, 2017, provisional application No. 62/448,885, filed on Jan. 20, 2017.

(51) Int. Cl.
*H04L 9/00* (2022.01)
*G06F 16/901* (2019.01)
*G06F 16/909* (2019.01)
*H04L 9/32* (2006.01)

(58) Field of Classification Search
USPC ......................................................... 713/189
See application file for complete search history.

(56) References Cited

U.S. PATENT DOCUMENTS

| | | |
|---|---|---|
| 6,745,220 B1 | 6/2004 | Hars |
| 6,748,412 B2 | 6/2004 | Ruehle |
| 6,910,059 B2 | 6/2005 | Lu et al. |
| 7,712,143 B2 | 5/2010 | Comlekoglu |
| 7,849,185 B1 | 12/2010 | Rockwood |
| 7,870,398 B2 | 1/2011 | Perng et al. |
| 7,937,270 B2 | 5/2011 | Smaragdis et al. |
| 8,515,058 B1 | 8/2013 | Gentry |
| 8,526,603 B2 * | 9/2013 | Kerschbaum ........... H04L 9/302 380/30 |
| 8,565,435 B2 | 10/2013 | Gentry et al. |
| 8,781,967 B2 | 7/2014 | Tehranchi et al. |
| 8,832,465 B2 | 9/2014 | Gulati et al. |
| 9,059,855 B2 | 6/2015 | Johnson et al. |
| 9,094,378 B1 | 7/2015 | Yung et al. |
| 9,189,411 B2 | 11/2015 | Mckeen et al. |
| 9,215,219 B1 | 12/2015 | Krendelev et al. |
| 9,288,039 B1 | 3/2016 | Monet et al. |
| 9,491,111 B1 | 11/2016 | Roth et al. |
| 9,503,432 B2 | 11/2016 | El Emam et al. |
| 9,514,317 B2 | 12/2016 | Martin et al. |
| 9,565,020 B1 | 2/2017 | Camenisch et al. |
| 9,577,829 B1 | 2/2017 | Roth et al. |
| 9,652,609 B2 | 5/2017 | Kang et al. |
| 9,716,590 B2 * | 7/2017 | Gentry .................. H04L 9/3093 |
| 9,846,787 B2 | 12/2017 | Johnson et al. |
| 9,852,306 B2 | 12/2017 | Cash et al. |
| 9,942,032 B1 | 4/2018 | Kornaropoulos et al. |
| 9,946,810 B1 | 4/2018 | Trepetin et al. |
| 9,973,334 B2 | 5/2018 | Hibshoosh et al. |
| 10,027,486 B2 | 7/2018 | Liu |
| 10,055,602 B2 | 8/2018 | Deshpande et al. |
| 10,073,981 B2 | 9/2018 | Arasu et al. |
| 10,075,288 B1 | 9/2018 | Khedr et al. |
| 10,120,893 B1 | 11/2018 | Rocamora et al. |
| 10,127,234 B1 | 11/2018 | Krishnan et al. |
| 10,129,028 B2 | 11/2018 | Kamakari et al. |
| 10,148,438 B2 | 12/2018 | Evancich et al. |
| 10,181,049 B1 | 1/2019 | El Defrawy et al. |
| 10,210,266 B2 | 2/2019 | Antonopoulos et al. |
| 10,235,539 B2 | 3/2019 | Ito et al. |
| 10,255,454 B2 | 4/2019 | Kamara et al. |
| 10,333,715 B2 | 6/2019 | Chu et al. |
| 10,375,042 B2 | 8/2019 | Chaum |
| 10,396,984 B2 | 8/2019 | French et al. |
| 10,423,806 B2 | 9/2019 | Cerezo Sanchez |
| 10,489,604 B2 | 11/2019 | Yoshino et al. |
| 10,496,631 B2 | 12/2019 | Tschudin et al. |
| 10,644,876 B2 | 5/2020 | Williams et al. |
| 10,693,627 B2 | 6/2020 | Carr |
| 10,721,057 B2 | 7/2020 | Carr |
| 10,728,018 B2 | 7/2020 | Williams et al. |
| 10,771,237 B2 | 9/2020 | Williams et al. |
| 10,790,960 B2 | 9/2020 | Williams et al. |
| 10,817,262 B2 | 10/2020 | Carr et al. |
| 10,873,568 B2 | 12/2020 | Williams |
| 10,880,275 B2 | 12/2020 | Williams |
| 10,902,133 B2 | 1/2021 | Williams et al. |
| 10,903,976 B2 | 1/2021 | Williams et al. |
| 10,972,251 B2 | 4/2021 | Carr |
| 11,196,540 B2 | 12/2021 | Williams et al. |
| 11,196,541 B2 | 12/2021 | Williams et al. |
| 11,451,370 B2 | 9/2022 | Williams et al. |
| 11,477,006 B2 | 10/2022 | Williams et al. |
| 11,507,683 B2 | 11/2022 | Williams et al. |
| 11,558,358 B2 | 1/2023 | Williams |
| 2002/0032712 A1 | 3/2002 | Miyasaka et al. |
| 2002/0073316 A1 | 6/2002 | Collins et al. |
| 2002/0104002 A1 | 8/2002 | Nishizawa et al. |
| 2003/0037087 A1 | 2/2003 | Rarick |
| 2003/0059041 A1 | 3/2003 | MacKenzie et al. |
| 2003/0110388 A1 | 6/2003 | Pavlin et al. |
| 2004/0167952 A1 | 8/2004 | Gueron et al. |
| 2005/0008152 A1 | 1/2005 | MacKenzie |
| 2005/0076024 A1 | 4/2005 | Takatsuka et al. |
| 2005/0259817 A1 | 11/2005 | Ramzan et al. |
| 2006/0008080 A1 | 1/2006 | Higashi et al. |
| 2006/0008081 A1 | 1/2006 | Higashi et al. |
| 2007/0053507 A1 | 3/2007 | Smaragdis et al. |
| 2007/0095909 A1 | 5/2007 | Chaum |
| 2007/0140479 A1 | 6/2007 | Wang et al. |
| 2007/0143280 A1 | 6/2007 | Wang et al. |
| 2009/0037504 A1 | 2/2009 | Hussain |
| 2009/0083546 A1 | 3/2009 | Staddon et al. |
| 2009/0193033 A1 | 7/2009 | Ramzan et al. |
| 2009/0268908 A1 | 10/2009 | Bikel et al. |
| 2009/0279694 A1 | 11/2009 | Takahashi et al. |
| 2009/0287837 A1 | 11/2009 | Felsher |
| 2010/0202606 A1 | 8/2010 | Almeida |
| 2010/0205430 A1 | 8/2010 | Chiou et al. |
| 2010/0241595 A1 | 9/2010 | Felsher |
| 2011/0026781 A1 | 2/2011 | Osadchy et al. |
| 2011/0107105 A1 | 5/2011 | Hada |
| 2011/0110525 A1 | 5/2011 | Gentry |
| 2011/0243320 A1 | 10/2011 | Halevi et al. |
| 2011/0283099 A1 | 11/2011 | Nath et al. |
| 2012/0039469 A1 | 2/2012 | Mueller et al. |
| 2012/0054485 A1 | 3/2012 | Tanaka et al. |
| 2012/0066510 A1 | 3/2012 | Weinman |
| 2012/0201378 A1 | 8/2012 | Nabeel et al. |
| 2012/0265794 A1 | 10/2012 | Niel |
| 2012/0265797 A1 | 10/2012 | Niel |
| 2013/0010950 A1 | 1/2013 | Kerschbaum |
| 2013/0051551 A1 | 2/2013 | El Aimani |
| 2013/0054665 A1 | 2/2013 | Felch |
| 2013/0114811 A1 | 5/2013 | Boufounos et al. |
| 2013/0148868 A1 | 6/2013 | Troncoso Pastoriza et al. |
| 2013/0170640 A1 | 7/2013 | Gentry |
| 2013/0191650 A1 | 7/2013 | Balakrishnan et al. |
| 2013/0195267 A1 | 8/2013 | Alessio et al. |
| 2013/0198526 A1 | 8/2013 | Goto |
| 2013/0216044 A1 | 8/2013 | Gentry et al. |
| 2013/0230168 A1 | 9/2013 | Takenouchi |
| 2013/0237242 A1 | 9/2013 | Oka et al. |
| 2013/0246813 A1 | 9/2013 | Mori et al. |

(56) References Cited

U.S. PATENT DOCUMENTS

| | | |
|---|---|---|
| 2013/0318351 A1* | 11/2013 | Hirano .................. H04L 9/3073 713/168 |
| 2013/0326224 A1 | 12/2013 | Yavuz |
| 2013/0339722 A1 | 12/2013 | Krendelev et al. |
| 2013/0339751 A1 | 12/2013 | Sun et al. |
| 2013/0346741 A1 | 12/2013 | Kim et al. |
| 2013/0346755 A1 | 12/2013 | Nguyen et al. |
| 2014/0164758 A1 | 6/2014 | Ramamurthy et al. |
| 2014/0189811 A1 | 7/2014 | Taylor et al. |
| 2014/0233727 A1 | 8/2014 | Rohloff et al. |
| 2014/0281511 A1 | 9/2014 | Kaushik et al. |
| 2014/0355756 A1 | 12/2014 | Iwamura et al. |
| 2015/0100785 A1 | 4/2015 | Joye et al. |
| 2015/0100794 A1 | 4/2015 | Joye et al. |
| 2015/0205967 A1 | 7/2015 | Naedele et al. |
| 2015/0215123 A1 | 7/2015 | Kipnis et al. |
| 2015/0227930 A1 | 8/2015 | Quigley et al. |
| 2015/0229480 A1 | 8/2015 | Joye et al. |
| 2015/0244517 A1 | 8/2015 | Nita |
| 2015/0248458 A1 | 9/2015 | Sakamoto |
| 2015/0304736 A1 | 10/2015 | Lal et al. |
| 2015/0358152 A1 | 12/2015 | Ikarashi et al. |
| 2015/0358153 A1 | 12/2015 | Gentry |
| 2016/0004874 A1 | 1/2016 | Ioannidis et al. |
| 2016/0036826 A1 | 2/2016 | Pogorelik et al. |
| 2016/0072623 A1 | 3/2016 | Joye et al. |
| 2016/0105402 A1 | 4/2016 | Soon-Shiong et al. |
| 2016/0105414 A1 | 4/2016 | Bringer et al. |
| 2016/0119346 A1 | 4/2016 | Chen et al. |
| 2016/0140348 A1 | 5/2016 | Nawaz et al. |
| 2016/0179945 A1 | 6/2016 | Lastra Diaz et al. |
| 2016/0182222 A1 | 6/2016 | Rane et al. |
| 2016/0323098 A1 | 11/2016 | Bathen |
| 2016/0335450 A1 | 11/2016 | Yoshino et al. |
| 2016/0344557 A1 | 11/2016 | Chabanne et al. |
| 2016/0350648 A1 | 12/2016 | Gilad-Bachrach et al. |
| 2016/0366126 A1 | 12/2016 | Sharifi et al. |
| 2017/0070340 A1 | 3/2017 | Hibshoosh et al. |
| 2017/0070351 A1 | 3/2017 | Yan |
| 2017/0099133 A1 | 4/2017 | Gu et al. |
| 2017/0134158 A1 | 5/2017 | Pasol et al. |
| 2017/0185776 A1 | 6/2017 | Robinson et al. |
| 2017/0264426 A1 | 9/2017 | Joye et al. |
| 2017/0366562 A1 | 12/2017 | Zhang et al. |
| 2018/0091466 A1 | 3/2018 | Friedman et al. |
| 2018/0139054 A1 | 5/2018 | Chu et al. |
| 2018/0198601 A1 | 7/2018 | Laine et al. |
| 2018/0204284 A1 | 7/2018 | Cerezo Sanchez |
| 2018/0212751 A1 | 7/2018 | Williams et al. |
| 2018/0212752 A1 | 7/2018 | Williams et al. |
| 2018/0212753 A1 | 7/2018 | Williams |
| 2018/0212754 A1 | 7/2018 | Williams et al. |
| 2018/0212755 A1 | 7/2018 | Williams et al. |
| 2018/0212756 A1 | 7/2018 | Carr |
| 2018/0212757 A1 | 7/2018 | Carr |
| 2018/0212758 A1 | 7/2018 | Williams et al. |
| 2018/0212759 A1 | 7/2018 | Williams et al. |
| 2018/0212775 A1 | 7/2018 | Williams |
| 2018/0212933 A1 | 7/2018 | Williams |
| 2018/0224882 A1 | 8/2018 | Carr |
| 2018/0234254 A1 | 8/2018 | Camenisch et al. |
| 2018/0267981 A1 | 9/2018 | Sirdey et al. |
| 2018/0270046 A1 | 9/2018 | Carr |
| 2018/0276417 A1 | 9/2018 | Cerezo Sanchez |
| 2018/0343109 A1 | 11/2018 | Koseki et al. |
| 2018/0181802 A1 | 12/2018 | Chen et al. |
| 2018/0349632 A1 | 12/2018 | Bent et al. |
| 2018/0359097 A1 | 12/2018 | Lindell |
| 2018/0373882 A1 | 12/2018 | Veugen |
| 2019/0013950 A1 | 1/2019 | Becker et al. |
| 2019/0042786 A1 | 2/2019 | Williams et al. |
| 2019/0108350 A1 | 4/2019 | Bohli et al. |
| 2019/0158272 A1 | 5/2019 | Chopra et al. |
| 2019/0229887 A1 | 7/2019 | Ding et al. |
| 2019/0238311 A1 | 8/2019 | Zheng |
| 2019/0251553 A1 | 8/2019 | Ma et al. |
| 2019/0251554 A1 | 8/2019 | Ma et al. |
| 2019/0253235 A1 | 8/2019 | Zhang et al. |
| 2019/0260585 A1 | 8/2019 | Kawai et al. |
| 2019/0266282 A1 | 8/2019 | Mitchell et al. |
| 2019/0280880 A1 | 9/2019 | Zhang et al. |
| 2019/0312728 A1 | 10/2019 | Poeppelmann |
| 2019/0327078 A1 | 10/2019 | Zhang et al. |
| 2019/0334716 A1 | 10/2019 | Kocsis et al. |
| 2019/0349191 A1 | 11/2019 | Soriente et al. |
| 2019/0371106 A1 | 12/2019 | Kaye |
| 2020/0019882 A1 | 1/2020 | Garg et al. |
| 2020/0134200 A1 | 4/2020 | Williams et al. |
| 2020/0150930 A1 | 5/2020 | Carr et al. |
| 2020/0204341 A1 | 6/2020 | Williams et al. |
| 2020/0382274 A1 | 12/2020 | Williams et al. |
| 2020/0396053 A1 | 12/2020 | Williams et al. |
| 2021/0034765 A1 | 2/2021 | Williams et al. |
| 2021/0105256 A1 | 4/2021 | Williams |
| 2021/0409191 A1 | 12/2021 | Williams et al. |
| 2023/0006819 A1 | 1/2023 | Spector |

FOREIGN PATENT DOCUMENTS

| | | |
|---|---|---|
| JP | 5680007 B2 | 3/2015 |
| KR | 101386294 B1 | 4/2014 |
| WO | WO2014105160 A1 | 7/2014 |
| WO | WO2015094261 A1 | 6/2015 |
| WO | WO2016003833 A1 | 1/2016 |
| WO | WO2016018502 A1 | 2/2016 |
| WO | WO2018091084 A1 | 5/2018 |
| WO | WO2018136801 A1 | 7/2018 |
| WO | WO2018136804 A1 | 7/2018 |
| WO | WO2018136811 A1 | 7/2018 |

OTHER PUBLICATIONS

"International Search Report" and "Written Opinion of the International Searching Authority," Patent Cooperation Treaty Application No. PCT/US2018/014530, dated Apr. 23, 2018, 7 pages.

"International Search Report" and "Written Opinion of the International Searching Authority," Patent Cooperation Treaty Application No. PCT/US2018/014551, dated Apr. 24, 2018, 8 pages.

Petition to Insitute Derivation Proceeding Pursuant to 35 USC 135; Case No. DER2019-00009, US Patent and Trademark Office Patent Trial and Appeal Board; dated Jul. 26, 2019, 272 pages. (2 PDFs).

SCAMP Working Paper L29/11, "A Woods Hole Proposal Using Striping," Dec. 2011, 14 pages.

O'Hara, Michael James, "Shovel-ready Private Information Retrieval," Dec. 2015, 4 pages.

Carr, Benjamin et al., "Proposed Laughing Owl," NSA Technical Report, Jan. 5, 2016, 18 pages.

Williams, Ellison Anne et al., "Wideskies: Scalable Private Information Retrieval," Jun. 8, 2016, 14 pages.

Carr, Benjamin et al., "A Private Stream Search Technique," NSA Technical Report, Dec. 1, 2015, 18 pages.

Drucker et al., "Paillier-encrypted databases with fast aggregated queries," 2017 14th IEEE Annual Consumer Communications & Networking Conference (CCNC), Jan. 8-11, 2017, pp. 848-853.

Tu et al., "Processing Analytical Queries over Encrypted Data," Proceedings of the VLDB Endowment, vol. 6, Issue No. 5, Mar. 13, 2013. pp. 289-300.

Boneh et al., "Private Database Queries Using Somewhat Homomorphic Encryption", Cryptology ePrint Archive: Report 2013/422, Standford University [online], Jun. 27, 2013, [retrieved on Dec. 9, 2019], 22 pages.

Chen et al., "Efficient Multi-Key Homomorphic Encryption with Packed Ciphertexts with Application to Oblivious Neural Network Inference", CCS '19 Proceedings of the 2019 ACM SIGSAC Conference on Computer and Communications Security, May 19, 2019. pp. 395-412.

Armknecht et al., "A Guide to Fully Homomorphic Encryption" IACR Cryptology ePrint Archive: Report 2015/1192 [online], Dec. 14, 2015, 35 pages.

(56) References Cited

OTHER PUBLICATIONS

Bayar et al., "A Deep Learning Approach To Universal Image Manipulation Detection Using A New Convolutional Layer", IH&MMSec 2016, Jun. 20-22, 2016. pp. 5-10.
Juvekar et al. "Gazelle: A Low Latency Framework for Secure Neural Network Inference", 27th USENIX Security Symposium, Aug. 15-17, 2018. pp. 1650-1668.
Bösch et al., "SOFIR: Securely Outsourced Forensic Recognition," 2014 IEEE International Conference on Acoustic, Speech and Signal Processing (ICASSP), IEEE 978-1-4799-2893-4/14, 2014, pp. 2713-2717.
Waziri et al., "Big Data Analytics and Data Security in the Cloud via Fullly Homomorphic Encryption," World Academy of Science, Engineering and Technology International Journal of Computer, Electrical, Automation, Control and Information Engineering, vol. 9, No. 3, 2015, pp. 744-753.
Bajpai et al., "A Fully Homomorphic Encryption Implementation on Cloud Computing," International Journal of Information & Computation Technology, ISSN 0974-2239 vol. 4, No. 8, 2014, pp. 811-816.
Viejo et al., "Asymmetric homomorphisms for secure aggregation in heterogeneous scenarios," Information Fusion 13, Elsevier B.V., Mar. 21, 2011, pp. 285-295.
Patil et al., "Big Data Privacy Using Fully Homomorphic Non-Deterministic Encryption," IEEE 7th International Advance Computing Conference, Jan. 5-7, 2017, 15 pages.
Panda et al., "FPGA Prototype of Low Latency BBS PRNG," IEEE International Symposium on Nanoelectronic and Information Systems, Dec. 2015, pp. 118-123, 7 pages.
Sahu et al., "Implementation of Modular Multiplication for RSA Algorithm," 2011 International Conference on Communication Systems and Network Technologies, 2011, pp. 112-114, 3 pages.
Drucker et al., "Achieving trustworthy Homomorphic Encryption by combining it with a Trusted Execution Environment," Journal of Wireless Mobile Networks, Ubiquitous Computing, and Dependable Application (JoWUA), Mar. 2018, pp. 86-99.
Google Scholar, search results for "trusted execution environment database", 2 pages, Aug. 1, 2020.
PIRK Code Excerpt—QuerierDriver, https://github.com/apache/incubator-retired-pirk/blob/master/src/main/java/org/apache/pirk/querier/wideskies/QuerierDriver.java; Jul. 11, 2016; 5 pages.
PIRK Code Excerpt—QuerierDriverCLI, https://github.com/apache/incubator-retired-pirk/blob/master/src/main/java/org/apache/pirk/querier/wideskies/QuerierCLI.java; Jul. 11, 2016; 9 pages.
PIRK Code Excerpt—Query; [online]; Retreived from the Internet: <URL: https://github.com/apache/incubaror-retired-pirk/blob/master/src/main/java/org/apache/pirk/query/wideskies/Query.java>; Jul. 11, 2016; 7 pages.
PIRK Code Excerpt—QueryInfo; [online]; Retreived from the Internet: <URL: https://github.com/apache/incubator-retired-pirk/blob/master/src/main/java/org/apache/pirk/query/wideskies/QueryInfo.java>; Jul. 11, 2016; 4 pages.
PIRK Code Excerpt—ComputeResponse; [online]; Retreived from the Internet: <URL: https://github.com/apache/incubator-retired-pirk/blob/master/src/main/java/org/apache/pirk/responder/wideskies/spark/ComputeResponse.java>; Jul. 11, 2016; 8 pages.
PIRK Code Excerpt—HashSelectorsAndPartitionData; [online]; Retreived from the Internet: <URL: https://github.com/apache/incubator-retired-pirk/blob/master/src/main/java/org/apache/pirk/responder/wideskies/spark/HashSelectorsAndPartitionData.java>; Jul. 11, 2016; 2 pages.
PIRK Code Excerpt—HashSelectorsAndFormPartitionsBigInteger; [online]; Retreived from the Internet: <URL: https://github.com/apache/incubator-retired-pirk/blob/master/src/main/java/org/apache/pirk/responder/wideskies/common/HashSelectorAndPartitionData.java>; Jul. 11, 2016; 3 pages.
PIRK Code Excerpt—QueryUtils; [online]; Retreived from the Internet: <URL: https://github.com/apache/incubator-retired-pirk/blob/master/src/main/java/org/apache/pirk/query/wideskies/QueryUtils.java>; Jul. 11, 2016; 8 pages.
PIRK Code Excerpt—QuerySchema; [online]; Retreived from the Internet: <URL: https://github.com/apache/incubator-retired-pirk/blob/master/src/main/java/org/apache/pirk/schema/query/QuerySchema.java>; Jul. 11, 2016; 3 pages.
"PIRK Proposal" Apache.org [online], [retrieved on Oct. 28, 2020]; Retreived from the Internet: <URL:https://cwiki.apache.org/confluence/display/incubator/PirkProposal>; Apr. 10, 2019; 5 pages.
Fan et al., "Somewhat Practical Fully Homomorphic Encryption", IACR Cryptol. ePrintArch. 2012, 19 pages.
"Microsoft Computer Dictionary", pp. 276 and 529, Microsoft Press, 5th Edition, ISBN 0735614954,2002, (Year: 2002), 4 pages.
"Homomorphic encryption", Wikipedia, May 22, 2021, pages.
Zhang et al., "Machine Learning-Based Coding Unit Depth Decisions for Flexible Complexity Allocation in High Efficiency Video Coding," IEEE Transactions on Image Processing, vol. 24, No. 7, Jul. 2015, pp. 2225-2238.
Halls-Moore, Michael, "Beginner's Guide to Decision Trees for Supervised Machine Learning", (online), downloaded May 1, 2023 from <URL: web. archive.org/web/20170317113722/https://www.quantstart.com/articles/Beginners-Guide-to-Decision-Trees-for-Supervised-Machine-Learning/>, Aug. 2, 2016, 13 pages.

* cited by examiner

| Field Name | Field Type | Description |
|---|---|---|
| site_domain | string | Website's domain |
| site_page | string | URL of page |
| site_id | string | Exchange specific site id (uuid) |
| app_id | string | Exchange specific app id (uuid) |
| app_name | string | App name |
| device_useragent | string | Browser useragent string |
| device_ip | string | IPv4 address |
| device_devicetype | string | General type of device: 4 for mobile, 2 for PC |
| device_make | string | Device make (apple, samsung, etc) |
| device_model | string | Device model (e.g., "Samsung SM-J700F") |
| device_os | string | Device operating system (e.g., "Android") |
| device_osv | string | Device operating system version (e.g., "6.0.1") |
| device_hwv | string | Hardware version of the device (e.g., "SM-J700F" for Samsung SM-J700F) |
| device_carrier | string | Mobile carrier (e.g., "Irancell") using exchange curated string names |
| device_connectiontype | integer | Network connection type, refer to List 5.22 of OpenRTB 2.5 spec |
| device_ifa | string | ID provided by mobile OS for advertiser use (iOS ifa or Android idfa) |
| id_type | string | For mobile app ads, ifa if iOS and idfa if Android |
| device_didsha1 | string | Hardware device ID (e.g., IMEI); hashed via SHA1 |
| device_dpidsha1 | string | Platform device ID (e.g., Android ID); hashed via SHA1 |
| device_macsha1 | string | MAC address of the device; hashed via SHA1 |
| latitude | float | Latitude from -90.0 to +90.0, where negative is south |
| longitude | float | Longitude from -180.0 to +180.0, where negative is west |
| device_geo_type | integer | Source of location data, refer to List 5.20 of OpenRTB 2.5 spec |

*FIG. 4*

```
SELECT
    timestamp,
    device_geo_coded,
    device_ifa,
    app_name,
    device_make,
    device_model,
    latitude,
    longitude
FROM iqt.rtb
WHERE great_circle_distance(33.231766, 44.388328, latitude, longitude) < 0.83076474293315941
    AND device_make = 'Apple'
    AND app_name in ('Barner', 'Lorillar', 'Solaris', 'iHeartMedical', 'Connective', 'Solutional')
```

```
┌─────────────────────────────────────────────────────────────────────┐
│ Receive, by at least one server from a client, a term generation    │
│ function, a hash function, a public key of a homomorphic encryption │
│ scheme, and a homomorphically encrypted list of indices generated   │
│ based on a query                                                    │
│ 605                                                                 │
└─────────────────────────────────────────────────────────────────────┘
                                  │
                                  ▼
┌─────────────────────────────────────────────────────────────────────┐
│ Apply, by the server, the term generation function, the hash        │
│ function, and the public key to a data set to determine a further   │
│ homomorphically encrypted list of indices and a homomorphically     │
│ encrypted data set                                                  │
│ 610                                                                 │
└─────────────────────────────────────────────────────────────────────┘
                                  │
                                  ▼
┌─────────────────────────────────────────────────────────────────────┐
│ Extract, by the server and using the homomorphically encrypted list │
│ of indices and the further homomorphically encrypted list of        │
│ indices, data from the homomorphically encrypted data set to obtain │
│ an encrypted result                                                 │
│ 615                                                                 │
└─────────────────────────────────────────────────────────────────────┘
                                  │
                                  ▼
┌─────────────────────────────────────────────────────────────────────┐
│ Send, by the at least one server, the at least one encrypted result │
│ to the client, wherein the client is configured to decrypt the at   │
│ least one encrypted result using a private key of the homomorphic   │
│ encryption scheme                                                   │
│ 620                                                                 │
└─────────────────────────────────────────────────────────────────────┘
```

SECURE ANALYTICS USING TERM GENERATION AND HOMOMORPHIC ENCRYPTION

CROSS-REFERENCE TO RELATED APPLICATIONS

This application is a continuation-in-part of U.S. patent application Ser. No. 16/158,230, filed Oct. 11, 2018. The U.S. patent application Ser. No. 16/158,230 is a continuation-in-part of U.S. patent application Ser. No. 15/875,914, filed Jan. 19, 2018, which claims the benefit of U.S. Provisional Application No. 62/448,890, filed on Jan. 20, 2017; U.S. Provisional Application No. 62/448,918, filed on Jan. 20, 2017; U.S. Provisional Application No. 62/448,893, filed on Jan. 20, 2017; U.S. Provisional Application No. 62/448,906, filed on Jan. 20, 2017; U.S. Provisional Application No. 62/448,908, filed on Jan. 20, 2017; U.S. Provisional Application No. 62/448,913, filed on Jan. 20, 2017; U.S. Provisional Application No. 62/448,916, filed on Jan. 20, 2017; U.S. Provisional Application No. 62/448,883, filed on Jan. 20, 2017; U.S. Provisional Application No. 62/448,885, filed on Jan. 20, 2017; U.S. Provisional Application No. 62/448,902, filed on Jan. 20, 2017; U.S. Provisional Application No. 62/448,896, filed on Jan. 20, 2017; U.S. Provisional Application No. 62/448,899, filed on Jan. 20, 2017; and U.S. Provisional Application No. 62/462,818, filed on Feb. 23, 2017. The subject matter of the aforementioned applications is hereby incorporated by reference for all purposes.

TECHNICAL FIELD

This disclosure relates to the technical field of secure data processing. More specifically, this disclosure relates to systems and methods for performing secure analytics using term generation and a homomorphic encryption.

BACKGROUND

With development of computer technologies, sensitive data, such as financial information and medical records can be kept on remote servers or cloud-based computing resources. Authorized users can access the sensitive data through applications running, for example, on their personal computing devices. Typically, personal computing devices are connected, via data networks, to servers or cloud-based computing resources. Therefore, messages sent over the data network can be subject to unauthorized access during the transmission as well as during processing on the remote servers or cloud-based computing resources.

Encryption techniques, such as homomorphic encryption, can be applied to the sensitive data and messages to prevent unauthorized access during the transmission over a network and processing in the data environment. Encryption and decryption may include specific algebraic operations performed on plaintext and/or ciphertext representing queries, data in data sources, and on responses to the queries. Performing the encryption and decryption may require additional time and computing resources of servers. The additional time may cause delays in processing of queries by the servers. Additionally, processing of queries may require accessing data from various data sources with different levels of security.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to the technology for secure data processing. Some embodiments of the present disclosure may facilitate performing secure analytics using term generation and homomorphic encryption.

According to one example embodiment of the present disclosure, a method for performing secure analytics using a homomorphic encryption is provided. An example method may include receiving, by at least one server from a client, a term generation function, a hash function, a public key of a homomorphic encryption scheme, and a homomorphically encrypted list of indices. Generation of the list of indices may include extracting, using the term generation function, a set of terms from a query, mapping, using the hash function, the terms in the set of terms to indices in a list of indices, and encrypting the indices in the list with the public key. The method may include applying, by the server, the term generation function, the hash function, and the public key to a data set to determine a further homomorphically encrypted list of indices and a homomorphically encrypted data set. The method may also include extracting, by the server and using the homomorphically encrypted list of indices and the further homomorphically encrypted list of indices, data from the homomorphically encrypted data set to obtain an encrypted result. The method may include sending, by the server, the encrypted result to the client, where the client can be configured to decrypt the encrypted result using a private key of the homomorphic encryption scheme.

Extracting the data may include matching indices from the further homomorphically encrypted list of indices to indices from the homomorphically encrypted list of indices. The term generation function is dynamically specified by the client at the time of sending the query to the at least one server. The term generation function can be configured to generate at least one search index for searching a document. The term generation function can be configured to generate at least one phonetic index to search for a word.

The term generation function can be configured to generate a feature vector for searching an image including biometrical data. The term generation function can be configured to generate a feature vector to search for an image of a face. The term generation function can be configured to generate a term for searching data having geospatial attributes. The term generation function can include a Structured Query Language (SQL) processing engine. The term generation function can include a machine learning model trained to generate the set of terms based on the query.

According to one example embodiment of the present disclosure, a system for performing secure analytics using a homomorphic encryption is provided. The system may include at least one processor and a memory storing processor-executable codes, wherein the at least one processor can be configured to implement the operations of the above-mentioned method for performing secure analytics using a homomorphic encryption.

According to yet another example embodiment of the present disclosure, the operations of the above-mentioned method for query processing with adaptive risk decisioning are stored on a machine-readable medium comprising instructions, which when implemented by one or more processors perform the recited method for performing secure analytics using a homomorphic encryption.

Other example embodiments of the disclosure and aspects will become apparent from the following description taken in conjunction with the following drawings.

BRIEF DESCRIPTION OF DRAWINGS

Exemplary embodiments are illustrated by way of example and not limitation in the figures of the accompanying drawings, in which like references indicate similar elements.

DETAILED DESCRIPTION

The technology disclosed herein is concerned with methods and systems for query processing. Embodiments of the present disclosure may facilitate processing queries requiring reading data from multiple data sources with different levels of protections.

According to some embodiments of the present disclosure, a system for performing secure analytics using a homomorphic encryption may include at least one server and at least one client. The server can receive, from the client, a term generation function, a hash function, a public key of a homomorphic encryption scheme, and a homomorphically encrypted list of indices. The list of indices can be generated by the client by extracting, using the term generation function, a set of terms from a query mapping, using the hash function, the terms in the set of terms to indices in a list of indices, and encrypting the indices in the list with the public key. The server can apply the term generation function, the hash function, and the public key to a data set to determine a further homomorphically encrypted list of indices and a homomorphically encrypted data set. The server may extract, using the homomorphically encrypted list of indices and the further homomorphically encrypted list of indices, data from the homomorphically encrypted data set to obtain an encrypted result. The server can send the encrypted result to the client, wherein the client is configured to decrypt the encrypted result using a private key of the homomorphic encryption scheme.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

Figure 1:
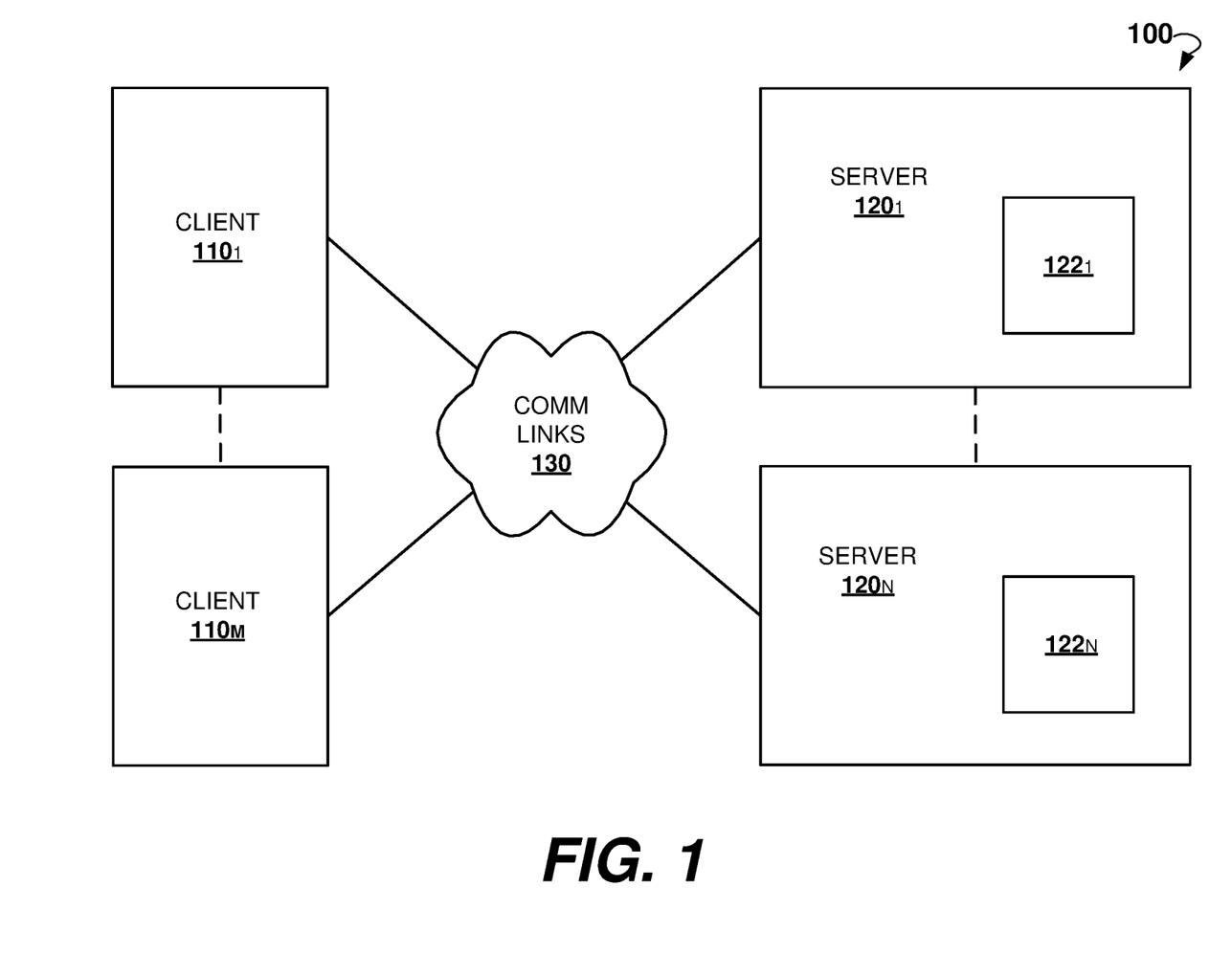
FIG. 1 shows a block diagram of an example environment suitable for practicing the methods described herein.

FIG. 1 shows a block diagram of an example environment 100 (also referred to as system 100) suitable for practicing the methods described herein. It should be noted, however, that the environment 100 is just one example and is a simplified embodiment provided for illustrative purposes, and reasonable deviations of this embodiment are possible as will be evident for those skilled in the art.

As shown in FIG. 1, the environment 100 may include one or more clients $110_1$-$110_M$, one or more servers $120_1$-$120_N$, and communications links 130. One or more clients $110_1$-$110_M$ and one or more servers $120_1$-$120_N$ can be disposed in same and/or different locations (e.g., offices, data centers, cities, counties, geographic regions, countries, continents, and so forth). Additionally or alternatively, one or more clients $110_1$-$110_M$ and one or more servers $120_1$-$120_N$ can each be in varied computing environments, including shared computing architectures, hybrid architectures, distinct architectures (e.g., cloud computing environments), and combinations thereof. One or more clients $110_1$-$110_M$ and one or more servers $120_1$-$120_N$ can include any of an application-specific integrated circuit (ASIC), field programmable gate array (FPGA), application-specific standard product (ASSP), an electronic circuit, a processor (shared, dedicated, or group) that executes one or more software or firmware programs, a combinational logic circuit, and/or other suitable components that provide the described functionality. Additionally or alternatively, one or more clients $110_1$-$110_M$ and one or more servers $120_1$-$120_N$ can include at least some of the characteristics of computing systems described further in relation to FIG. 7.

A target data source may be in a single server or distributed over multiple servers of one or more servers $120_1$-$120_N$ as target data source $122_1$-$122_N$. Target data source $122_1$-$122_N$ can be unencrypted (in plaintext form), deterministically encrypted (e.g., using Rivest, Shamir, & Adleman (RSA) encryption technology), semantically encrypted (e.g., using Advanced Encryption Standard (AES) technology), and combinations thereof. When target data source $122_1$-$122_N$ is a combination of encrypted and unencrypted fields, each field can be consistently encrypted or unencrypted. For example, when data source $122_1$-$122_N$ includes an unencrypted "employee name" field, the employees names are all unencrypted, as opposed to some name names being encrypted and others unencrypted. By way of further non-limiting example, when data source $122_1$-$122_N$ includes an encrypted "social security number" field, the social security numbers are all encrypted, as opposed to some social security numbers being encrypted and others unencrypted. Data stored in and/or retrieved from target data source $122_1$-$122_N$ can be encrypted and/or decrypted as described in relation to FIG. 2.

Figure 6:
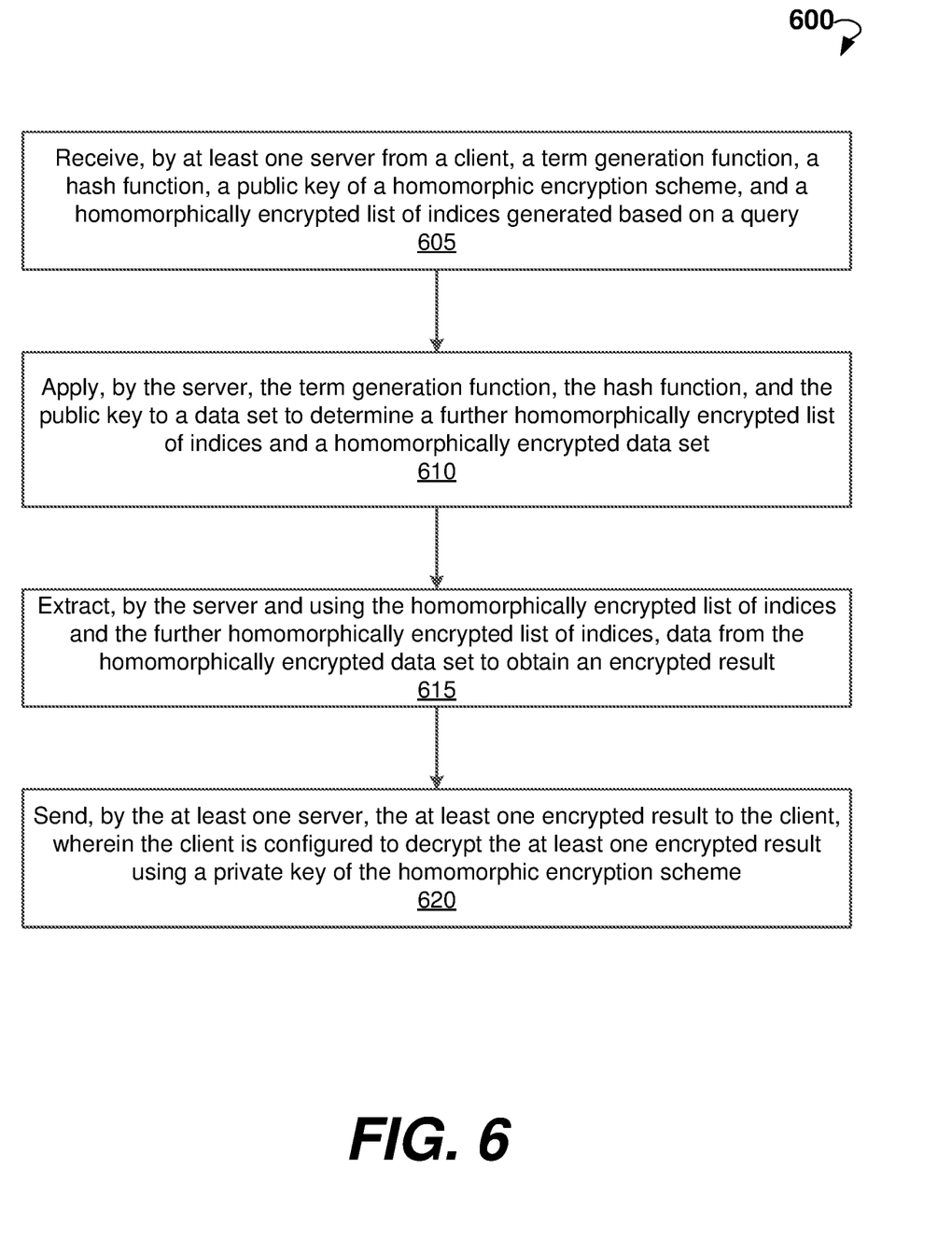
FIG. 6 is a flow chart of an example method for performing secure analytics using term generation and a homomorphic encryption, according to some example embodiments.

Communications links 130 can include various combinations and permutations of wired and wireless networks (e.g., Ethernet, Wi-Fi, Bluetooth, mobile broadband, the Internet, and so forth), internal/external computer busses, and the like, such as described in reference to FIG. 6. Although depicted as a single "block," communications links 130 can be, for example, multiple distinct/separate combinations and permutations of wired and wireless networks, internal/external computer busses, and the like.

In some embodiments, system 100 encrypts a desired query (or analytic) to be executed over target data source $122_1$-$322_N$ using a homomorphic encryption scheme, such as described with reference to FIG. 2. For example, system 100 (e.g., one or more clients $110_1$-$110_M$) encrypts the desired query as a homomorphic query matrix (Q_M). Q_M can be encrypted and the desired query should not be recoverable without a private key. For example, the private key can be associated with the keyed hash function. By way of further non-limiting example, the private key is not necessarily associated with the keyed hash function. Since one or more servers $120_1$-$120_N$ do not decrypt the desired query or the encrypted result E(R), one or more servers $120_1$-$120_N$ do not have the private key. The Q_M is a construct for conducting homomorphic queries, providing a secure and (completely) encrypted way to perform a query. In contrast, traditional methods of performing queries over data sources require decryption of the query. Construction of Q_M is described in more detail in the U.S. patent application Ser. No. 15/875,914, incorporated herein as reference for all purposes.

Figure 2:
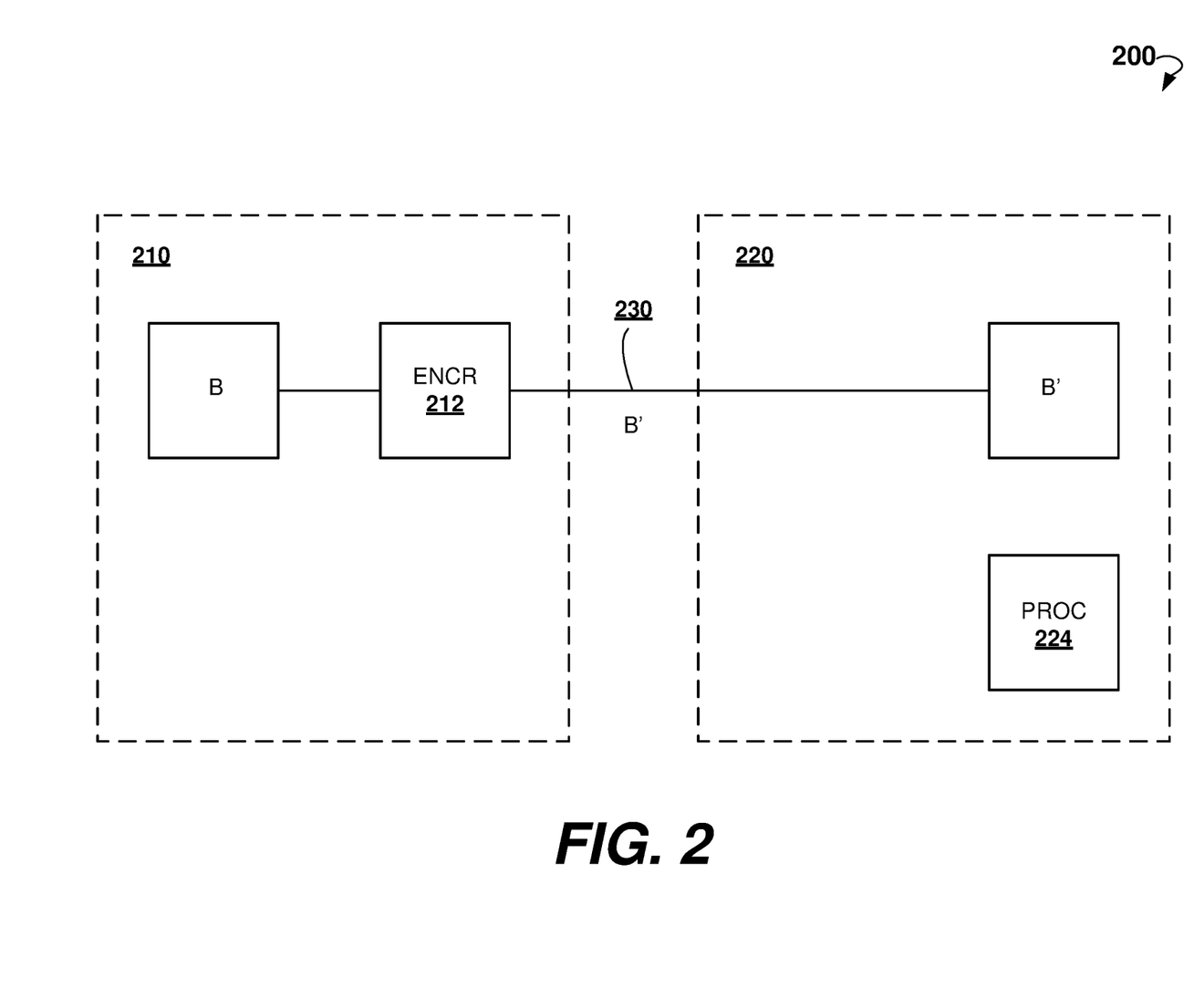
FIG. 2 shows a system for homomorphic encryption, according to various embodiments.

FIG. 2 shows system 200 for homomorphic encryption, according to various embodiments. System 200 can include source system 210, destination system 220, and communications link 230. Source system 210 and destination system 220 can include at least some of the characteristics of computing systems described further with reference to FIG. 7. Source system 210 can include encryption engine 212. Destination system 220 can include process 224. Encryption engine 212 and/or process 224 can include any of an application-specific integrated circuit (ASIC), field programmable gate array (FPGA), application-specific standard product (ASSP), an electronic circuit, a processor (shared, dedicated, or group) that executes one or more software or firmware programs, a combinational logic circuit, and/or other suitable components that provide the described functionality.

Encryption engine 212 can encrypt plaintext B into ciphertext B' using a homomorphic encryption algorithm and an encryption key. Homomorphic encryption is a form of encryption in which a certain algebraic operation (generally referred to as addition or multiplication) performed on plaintext is equivalent to another operation performed on ciphertext. Homomorphic encryption algorithms can be partially homomorphic (exhibits either additive or multiplicative homomorphism, or an unlimited number addition or multiplication operations and a limited number of multiplication or addition operations) or fully homomorphic (exhibits both additive and multiplicative homomorphism). For example, in partially homomorphic encryption schemes, multiplication in ciphertext is equal to addition of the same values in plaintext.

Examples of partially homomorphic cryptosystems include RSA (multiplicative homomorphism), ElGamal (multiplicative homomorphism), and Paillier (additive homomorphism). Other partially homomorphic cryptosystems include the Okamoto-Uchiyama, Naccache-Stern, Damgård-Jurik, Sander-Young-Yung, Boneh-Goh-Nissim, and Ishai-Paskin cryptosystems. Examples of fully homomorphic cryptosystems include: the Brakerski-Gentry-Vaikuntanathan, Brakerski's scale-invariant, NTRU-based, and Gentry-Sahai-Waters (GSW) cryptosystems.

Process 224 can be an operation performed (or application which works) on homomorphically encrypted information (e.g., ciphertext B') such that decrypting the result of the operation is the same as the result of some operation performed on the corresponding plaintext (e.g., plaintext B). For example, a homomorphically encrypted Internet search engine receives encrypted search terms and compare them with an encrypted index of the web. By way of further non-limiting example, a homomorphically encrypted financial database stored in the cloud allows users to ask how much money an employee earned within a particular time period. However, it would accept an encrypted employee name and output an encrypted answer, avoiding the privacy problems that can plague online services that deal with such sensitive data.

Communications link 230 can be various combinations and permutations of wired and wireless networks (e.g., Ethernet, Wi-Fi, Bluetooth, mobile broadband, the Internet, and so forth), internal/external computer busses, and the like, such as described with reference to FIG. 7.

Figure 3:
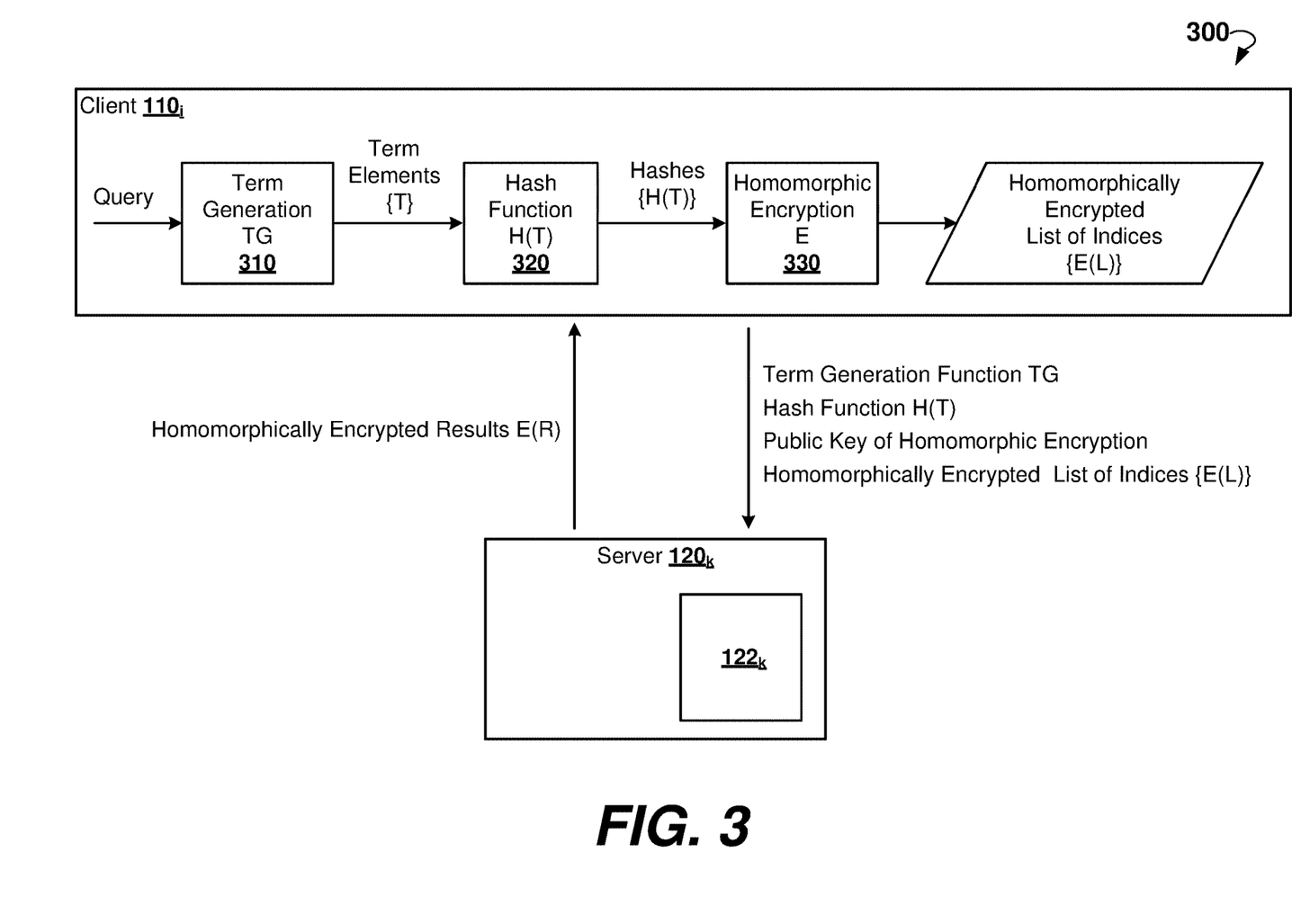
FIG. 3 is a block diagram illustrating specifics of homomorphic encryption scheme, according to some example embodiments.

FIG. 3 is a block diagram showing details of a homomorphic encryption scheme 300, according to some example embodiments. The scheme 300 can be implemented by the clients $110_1$-$110_M$. The clients $110_1$-$110_M$ can be configured to acquire a desired analytic A to be executed over data sources $122_1$-$122_M$.

The scheme 300 may include a term generation (TG) function 310. The term generation function 310 can be used to extract a set of term elements {T} of analytic A. For example, if the analytic A includes a frequency distribution for database elements in <row:column> pairs where row=Y, then the set {T} reflects the frequency distribution of these elements from the database.

The scheme 300 may further include a keyed hash function H(T) 320. The keyed hash function H(T) 320 can be used to obtain a set H(T)={H(T): T in {T}}. The set H(T) is the range of the hash function H(T) over the set of term elements {T}. The hash function H(T) can map values of terms to integers in a pre-specified range (for example, from 0 to $2^{20}-1$). The number of distinct elements in the set H(T) can be more or equal to the number of distinct elements in the set of term elements {T}.

The scheme 300 may further include a homomorphic encryption module 330. The module 330 can be used to construct a homomorphically encrypted list {E(L)} of indices, wherein E is a homomorphic encryption. The size of the list {E(L)} can be selected to be greater than the number s of distinct elements in the set of term elements {T}. In an example embodiment, the list {E(L)} can be generated using the following rule. For index j=0, . . . , (s−1): if H(T)=j for a term element T in the set {T}, then position j in the list {E(L)} can be equal to E(B_j), where B_j is a nonzero bit mask corresponding to the term element T and E(B_j) is a result of applying a public key of the homomorphic encryption to B_j. If there is no T in {T} such that H(T)=j, then position j in the list {E(L)} can be equal to E(0). In this manner, the list {E(L)} includes encryptions of nonzero bitmasks for the term elements present in the set {T} only. The analytic A and an unencrypted list {L} of indices of the terms elements {T} cannot be recovered from the list {E(L)} without a private key associated with the homomorphic encryption E. The private key can be kept only on the clients $110_1$-$110_M$.

The clients $110_1$-$110_M$ can send the list of indices {E{L}}, the term generation function TG, the keyed hash function H(T), and the public key of the homomorphic encryption E to the server(s) $120_1$-$120_N$.

In some embodiments, the servers $120_1$-$120_N$ can apply the term generation function TG, the keyed hash function H(T), and the public key of the homomorphic encryption E to data sources $122_1$-$122_N$ to get a further homomorphically encrypted list of indices and homomorphically encrypted data. The servers $120_1$-$120_N$ can use the homomorphically encrypted list {E{L}} and the further homomorphically encrypted list of indices to extract data from the homomorphically encrypted data to produce encrypted results E(R). Because the private key of the homomorphic encryption E is kept on the clients $110_1$-$110_M$, the servers $120_1$-$120_N$ cannot decrypt the homomorphically encrypted list {E{L}} or the results E(R). The servers $120_1$-$120_N$ can send the encrypted result E(R) to the clients $110_1$-$110_M$.

The clients $110_1$-$110_M$ can decrypt the encrypted results E(R) using the private key of the homomorphic encryption E to obtain the results R. Because the list {E(L)} includes nonzero entries for terms in set {T}, the homomorphic properties of the homomorphic encryption E ensure that only results corresponding to the nonzero elements of the list are present in results R.

Thus, the term generation function can be used to determine which fields in data sources are to be read to generate the results of queries or analytics. In various embodiments, the term generation function can be dynamically provided to the clients $110_1$-$110_M$ at the time of generating a query or analytic. The term generation function can be specified per query basis. This approach may provide flexibility in determination which data (for example, which fields in rows in tables) are to be extracted from the data sources.

In general, the clients $110_1$-$110_N$ may provide, to the servers $120_1$-$120_N$, a homomorphically encrypted list of indices within a fixed range. The fixed range can be numbers starting at zero and ending at, for example, 256, 10 million and so forth. The specific encrypted terms that can be searched for in the data sources can be specified by one of the numbers in the list of indices. The encrypted query can be constructed to look for a particular index (number). The term generation function in combination with keyed hash function can be used as a rule for mapping the terms that to be searched for in the data sources to the indices of the list of indices of the fixed range.

The term generation function may generate terms of external analytics, for example, feature vectors for biometrics, ranges for geospatial query, a phonetic index (for example Soundex), a document search query (for example, Lucene index), terms of SQL requests, and so forth. The term generation function can be a straightforward function configured, for example, can be configured to retrieve a name field from a certain row of data. The term generation function can be a sophisticated function configured to run fields through a trained machine-learning model and output the term.

Example 1

On the client side, the term generation function may include an SQL engine to analyze an SQL query. For example, the SQL query may include a social security number. The term generation function and keyed hash function may be used to determine how to map the social security number to an index in a list of indices of a fixed range. The list of indices can be encrypted using a public key of a homomorphic encryption.

On the server side, the same term generation function, keyed hash function, and the public key of the homomorphic encryption can be applied to the data in data sources, for example tables including records having social security numbers as a field, to determine homomorphically encrypted indices of the same fixed range corresponding to social security numbers found in records of the table. The public key can be applied to all the fields in the records to obtain a homomorphically encrypted table. The homomorphically encrypted list of indices generated on the client side can be then used to indicate which records of the table are to be read from the homomorphically encrypted table to generate a homomorphically encrypted result of the SQL query. For example, a record can be read if a homomorphically encrypted index of social security number in the record matches a homomorphically encrypted index indicated in the list of indices provided by the client. The server cannot decrypt the homomorphically encrypted list of indices or the homomorphically encrypted result without a private key of the homomorphic encryption. The encrypted result can be sent to the client, where the client decrypts the results using a private key.

Example 2

Figure 4:
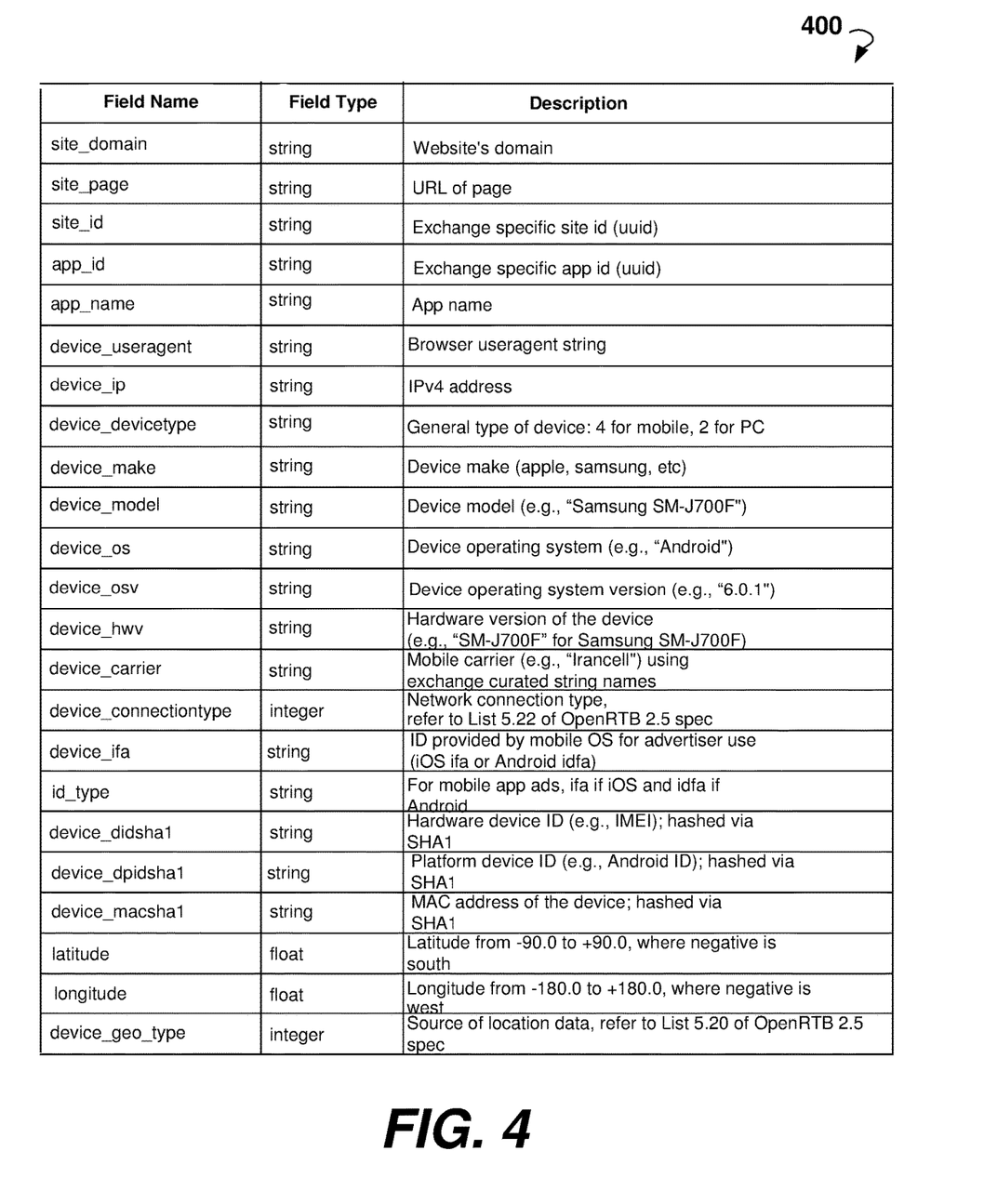
FIG. 4 shows an example scheme of a database including geospatial data associated with usage of mobile devices, according to an example embodiment.

FIG. 4 shows an example scheme 400 of a database storing geospatial data associated with usage of mobile devices, according to an example embodiment. The database of geospatial data can be stored on servers $120_1$-$120_N$.

Figure 5:
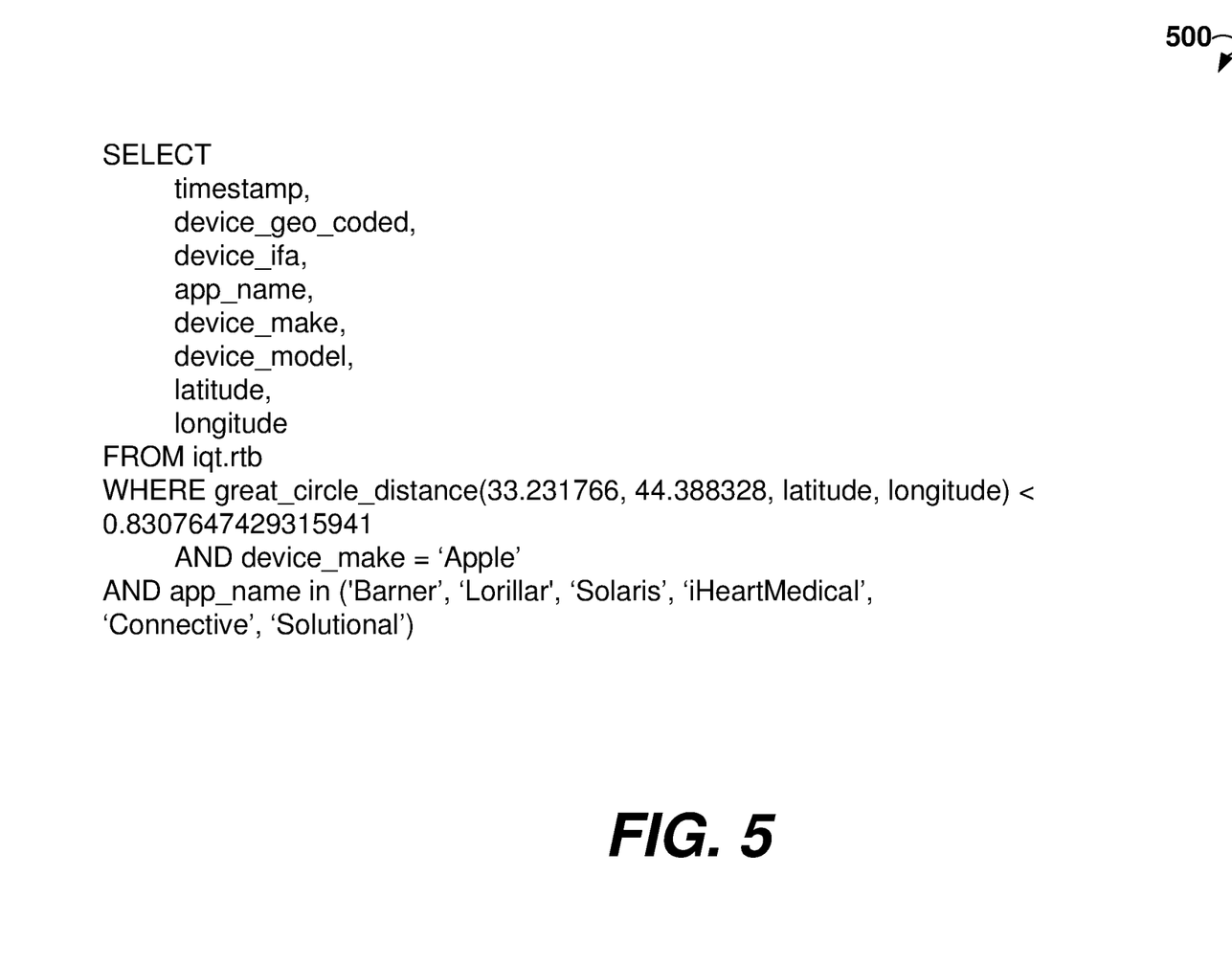
FIG. 5 is an example SQL query executed over the geospatial data, according to an example embodiment.

FIG. 5 is an example SQL query 500 to be executed over the geospatial data of the scheme 400, according to an example embodiment. Specifically, the SQL query 500 requests a list of mobile devices that were within a certain circle of geospatial data.

On the client side, the term generation function can analyze the SQL query to determine a set of terms related to the geospatial data. For example, the term generation function can divide the circle specified in the SQL query 500 into a set of discrete areas that cover the circle. The discrete areas can be of any predetermined shape and size, for example rectangles having certain geospatial coordinates. The discrete areas can be considered as terms of a certain set of terms (set of areas covering a certain area of Earth). The keyed hash function can be then used to map the discrete areas (terms) to indices in a list of indices of a fixed range. The list of indices can be encrypted using a public key of a homomorphic encryption. The client can send the homomorphically encrypted list of indices, the term generation function, the keyed hash function and the public key associated with the homomorphic encryption to the servers.

On the server side, the term generation function, the keyed hash function, and the public key can be applied to records in the database to obtain homomorphically encrypted indices of these records. The fields in the records can also be encrypted with the public key. The server may select the records of homomorphically encrypted indices matching at least one index in the homomorphically encrypted list of indices provided by the client. The selected homomorphically encrypted records may correspond to latitude and longitude points that belong to the circle originally indicated in the SQL query 500. The server cannot decrypt the selected homomorphically encrypted records because the private key of the homomorphic encryption is kept on the client. The selected homomorphically encrypted records can be decrypted with private key only on the client, so only a user of the client may view a list of mobile devices located in the circle specified by SQL query 500.

Example 3

On the client side, the term generation function may include a model which generates feature vectors based on, for example, images of faces, images of fingerprints, voice records, and so forth. The feature vectors can be considered as terms belonging to a list of indices of a fixed range, where the list of indices may correspond to all possible feature vectors. For example, all possible feature vectors can be enumerated from zero to a pre-determined maximum number.

If, for example, a query includes an image of a face, then the term generation function may determine, based on the model, the feature vectors corresponding to the face. The keyed hash function can be then used to map the terms (feature vectors) to indices in the list of indices. The list of indices can be encrypted using a public key of a homomorphic encryption. The client can send the homomorphically encrypted list of indices, the term generation function, the keyed hash function and the public key to the servers.

On the server side, the term generation function, the keyed hash function, and the public key can be applied to images stored on the servers to obtain homomorphically encrypted indices of these images. The images can be also encrypted with the public key. The server may select images indices of which match at least one index in the list of indices provided by the client. It should be noted that the matching is performed on homomorphically encrypted indices. The list of selected homomorphically encrypted images can be sent to the client.

Example 4

On the client side, the term generation function can be configured to generate, based one or more keywords, indices for searching text documents including the keywords. For example, the term generation function can generate Lucene indices. The indices for searching text documents can be used as terms belonging to a list of indices of a fixed range. The values of indices for searching text documents can be enumerated from zero to a pre-determined maximum number. The keyed hash function can be then used to map the search indices determined by the term generation function to indices in the list of indices. The list of indices can be encrypted using a public key of a homomorphic encryption. The client can send the homomorphically encrypted list of indices, the term generation function, the keyed hash function and the public key to the servers.

On the server side, the term generation function, the keyed hash function, and the public key can be applied to text documents stored on the servers to obtain indices of these documents. The server may select text documents indices of which match at least one index in the list of indices provided by the client. The matching is performed on the homomorphically encrypted indices. The list of selected text documents can be encrypted with a public key and sent to the client.

Example 5

On the client side, the term generation function may be configured to generate, based on a desired word, phonetic indices for searching a word sound similar to the desired word. For example, the term generation function may generate Soundex indices, which are a coded last name index. The Soundex indices are based on the way a surname sounds rather than the way it is spelled. Soundex indices for last names that sound the same, but are spelled differently, like SMITH and SMYTH, are the same. The phonetic indices are of a fixed range. The keyed hash function can be then used to map the phonetic indices determined by the term generation function to indices in a list of indices of the fixed range. The list of indices can be encrypted using a public key of a homomorphic encryption. The client can send the list of indices, the term generation function, the keyed hash function and the public key to the servers.

On the server side, the term generation function, the keyed hash function, and the public key can be applied to database that store records including the last names to obtain homomorphically encrypted indices of these last names. The last names can be also encrypted with the public key. The server may select records that include homomorphically encrypted last names corresponding to at least one homomorphically encrypted index in the list of indices provided by the client. The list of selected homomorphically encrypted records can be sent to the client.

FIG. 6 is a flow chart of an example method 600 for performing secure analytics using term generation and homomorphic encryption, according to some example embodiments. The method 600 can be performed within environment 100 illustrated in FIG. 1. Notably, the steps recited below may be implemented in an order different than described and shown in FIG. 6. Moreover, the method 600 may have additional steps (not shown herein), but which can be evident to those skilled in the art from the present disclosure. The method 600 may also have fewer steps than outlined below and shown in FIG. 6.

The method 600 may commence in block 605 with receiving, by at least one server, from a client, a term generation function, a hash function, a public key of a homomorphic encryption scheme, and a homomorphically encrypted list of indices. The homomorphically encrypted list of indexes can be generated by extracting, using the term generation function, a set of terms from a query, mapping, using the hash function, the terms in the set of terms to the indices in the list of indices, and encrypting, using the public key, the indices in the list of indices.

In block 610, the method 600 may include applying, by the server, the term generation function, the hash function, and the public key to a data set to determine a further homomorphically encrypted list of indices and a homomorphically encrypted data set.

In block 615, the method 600 may include extracting, by the at least one server and using the homomorphically encrypted list of indices and the further homomorphically encrypted list of indices, data from the homomorphically encrypted data set to obtain an encrypted result. Extracting data may include matching indices from the further homomorphically encrypted list of indices to indices from the homomorphically encrypted list of indices. The term generation function can be configured to generate at least one search index for searching a document. The term generation function can be configured to generate at least one phonetic index for searching for a word.

The term generation function can be configured to generate a feature vector for searching an image including biometrical data. The term generation function can be configured to generate a feature vector for searching for an image of a face.

The term generation function can be configured to generate a term for searching data having geospatial attributes. The term generation function can include a SQL processing engine. The term generation function includes a machine learning model trained to generate the set of terms based on the query. The term generation function can be dynamically specified by the client at the time of sending the query to the at least one server.

In block 620, the method 600 may include sending, by the at least one server, the encrypted result to the client. The client can be configured to decrypt the encrypted result using a private key of the homomorphic encryption scheme.

Figure 7:
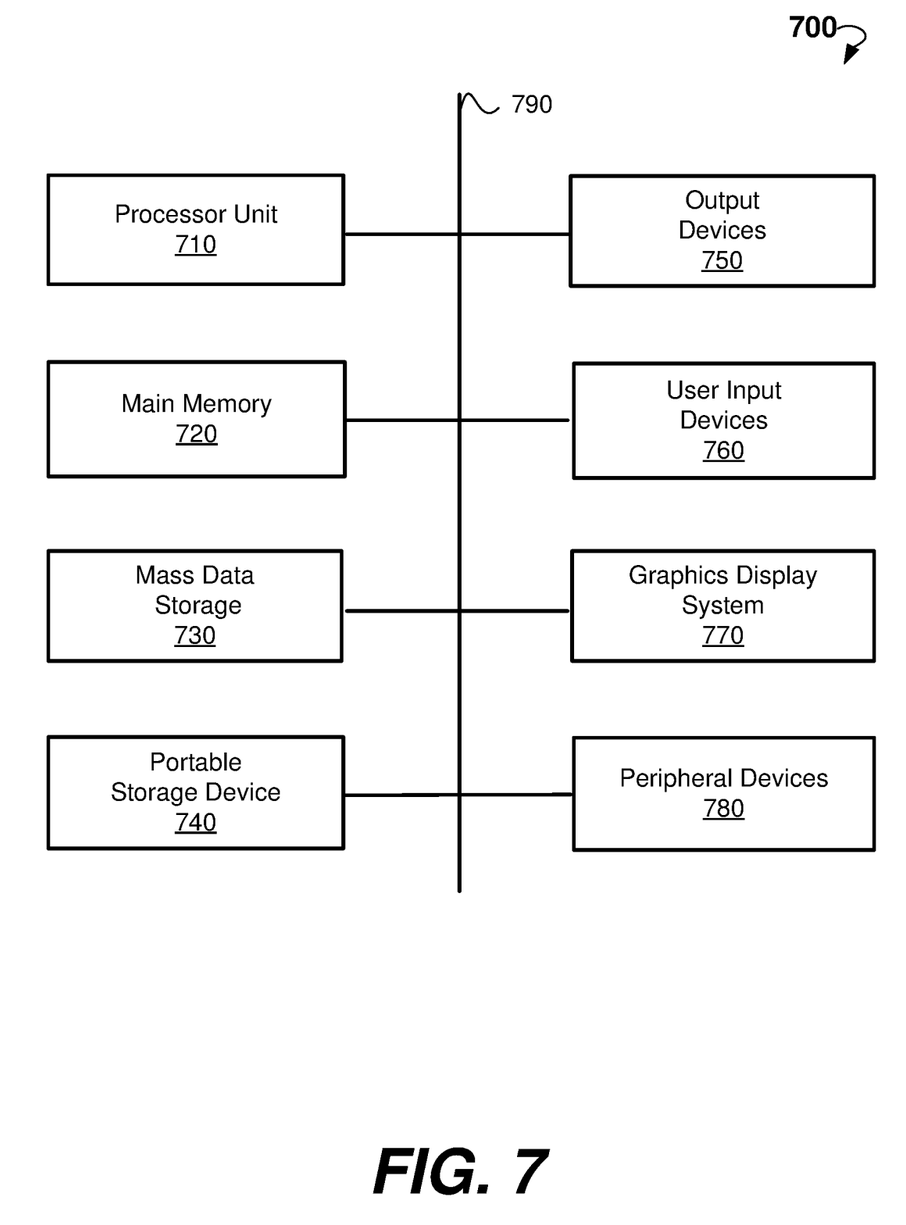
FIG. 7 illustrates an exemplary computer system that may be used to implement some embodiments of the present disclosure.

FIG. 7 illustrates an exemplary computer system 700 that may be used to implement some embodiments of the present disclosure. The computer system 700 of FIG. 7 may be implemented in the contexts of the likes of clients $110_1$-$110_M$, servers $120_1$-$120_N$, communications links 130, source system 210, destination system 220, and communications link 230, encryption engine 212, process 224, and target data source $122_1$-$122_N$. The computer system 700 of FIG. 7 includes one or more processor units 710 and main memory 720. Main memory 720 stores, in part, instructions and data for execution by processor units 710. Main memory 720 stores the executable code when in operation, in this example. The computer system 700 of FIG. 7 further includes a mass data storage 730, portable storage device 740, output devices 750, user input devices 760, a graphics display system 770, and peripheral devices 780.

The components shown in FIG. 7 are depicted as being connected via a single bus 790. The components may be connected through one or more data transport means. Processor unit 710 and main memory 720 is connected via a local microprocessor bus, and the mass data storage 730, peripheral device(s) 780, portable storage device 740, and graphics display system 770 are connected via one or more input/output (I/O) buses.

Mass data storage 730, which can be implemented with a magnetic disk drive, solid state drive, or an optical disk drive, is a non-volatile storage device for storing data and instructions for use by processor unit 710. Mass data storage 730 stores the system software for implementing embodiments of the present disclosure for purposes of loading that software into main memory 720.

Portable storage device 740 operates in conjunction with a portable non-volatile storage medium, such as a flash drive, floppy disk, compact disk, digital video disc, or Universal Serial Bus (USB) storage device, to input and output data and code to and from the computer system 700 of FIG. 7. The system software for implementing embodiments of the present disclosure is stored on such a portable medium and input to the computer system 700 via the portable storage device 740.

User input devices 760 can provide a portion of a user interface. User input devices 760 may include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, the computer system 700 as shown in FIG. 7 includes output devices 750. Suitable output devices 750 include speakers, printers, network interfaces, and monitors.

Graphics display system 770 include a liquid crystal display (LCD) or other suitable display device. Graphics display system 770 is configurable to receive textual and graphical information and processes the information for output to the display device.

Peripheral devices 780 may include any type of computer support device to add additional functionality to the computer system.

The components provided in the computer system 700 of FIG. 7 are those typically found in computer systems that may be suitable for use with embodiments of the present disclosure and are intended to represent a broad category of such computer components that are well known in the art. Thus, the computer system 700 of FIG. 7 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The processing for various embodiments may be implemented in software that is cloud-based. In some embodiments, the computer system 700 is implemented as a cloud-based computing environment, such as a virtual machine operating within a computing cloud. In other embodiments, the computer system 700 may itself include a cloud-based computing environment, where the functionalities of the computer system 700 are executed in a distributed fashion. Thus, the computer system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 700, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for performing secure analytics using a homomorphic encryption, the method comprising:
receiving, by at least one server from a client, a term generation function, a hash function, a public key of a homomorphic encryption scheme, and a homomorphically encrypted list of indices, the term generation function configured to generate a term for searching data having geospatial attributes, wherein generating the homomorphically encrypted list of indices includes:
extracting, using the term generation function, a set of terms from a query;
mapping, using the hash function, the terms in the set of terms to indices in a list of indices; and
encrypting, using the public key, the indices in the list;
applying, by the at least one server, the term generation function and the hash function to a data set to determine a further homomorphically encrypted list of indices and a homomorphically encrypted data set;
extracting, by the at least one server and using the homomorphically encrypted list of indices and the further homomorphically encrypted list of indices, data from the homomorphically encrypted data set to obtain an encrypted result; and
sending, by the at least one server, the encrypted result to the client, wherein the client is configured to decrypt the encrypted result using a private key of the homomorphic encryption scheme.

2. The method of claim 1, wherein the extracting includes matching indices from the further homomorphically encrypted list of indices to indices from the homomorphically encrypted list of indices.

3. The method of claim 1, wherein the term generation function is configured to generate at least one search index for searching a document.

4. The method of claim 1, wherein the term generation function is configured to generate at least one phonetic index for searching for a word.

5. The method of claim 1, wherein the term generation function is configured to generate a feature vector for searching an image including biometrical data.

6. The method of claim 5, wherein the term generation function is configured to generate a feature vector for searching for an image of a face.

7. The method of claim 1, wherein the term generation function includes a Structured Query Language (SQL) processing engine.

8. The method of claim 1, wherein the term generation function is dynamically specified by the client at a time of sending the query to the at least one server.

9. The method of claim 1, wherein the term generation function includes a machine learning model trained to generate the set of terms based on the query.

10. A system for performing secure analytics using a homomorphic encryption, the system comprising:
at least one processor; and
a memory communicatively coupled with the at least one processor, the memory storing instructions, which when executed by the at least processor perform a method comprising:
receiving, by at least one server from a client, a term generation function, a hash function, a public key of a homomorphic encryption scheme, and a homomorphically encrypted list of indices, the term generation function configured to generate a term for searching data having geospatial attributes, wherein generating the homomorphically encrypted list of indices includes:
extracting, using the term generation function, a set of terms from a query;
mapping, using the hash function, the terms in the set of terms to indices in a list of indices; and
encrypting, using the public key, the indices in the list;
applying, by the at least one server, the term generation function, the hash function, and the public key to a data set to determine a further homomorphically encrypted list of indices and a homomorphically encrypted data set;
extracting, by the at least one server and using the homomorphically encrypted list of indices and the further homomorphically encrypted list of indices, data from the homomorphically encrypted data set to obtain an encrypted result; and
sending, by the at least one server, the encrypted result to the client, wherein the client is configured to decrypt the encrypted result using a private key of the homomorphic encryption scheme.

11. The system of claim 10, wherein the extracting includes matching indices from the further homomorphically encrypted list of indices to indices from the homomorphically encrypted list of indices.

12. The system of claim 10, wherein the term generation function is configured to generate at least one search index for searching a document.

13. The system of claim 10, wherein the term generation function is configured to generate at least one phonetic index for searching for a word.

14. The system of claim 10, wherein the term generation function is configured to generate a feature vector for searching an image including biometrical data.

15. The system of claim 14, wherein the term generation function is configured to generate a feature vector for searching for an image of a face.

16. The system of claim 10, wherein the term generation function includes a Structured Query Language (SQL) processing engine.

17. The system of claim 10, wherein the term generation function is dynamically specified by the client at a time of sending the query to the at least one server.

18. A non-transitory computer-readable storage medium having embodied thereon instructions, which when executed by at least one processor, perform steps of a method, the method comprising:
receiving, by at least one server from a client, a term generation function, a hash function, a public key of a homomorphic encryption scheme, and a homomorphically encrypted list of indices, the term generation function configured to generate a term for searching data having geospatial attributes, wherein generating the homomorphically encrypted list of indices includes:
extracting, using the term generation function, a set of terms from a query;
mapping, using the hash function, the terms in the set of terms to indices in a list of indices; and
encrypting, using the public key, the indices in the list;
applying, by the at least one server, the term generation function, the hash function, and the public key to a data set to determine a further list of indices and a homomorphically encrypted data set;
extracting, by the at least one server and using the homomorphically encrypted list of indices and the further homomorphically encrypted list of indices, data from the homomorphically encrypted data set to obtain an encrypted result; and
sending, by the at least one server, the encrypted result to the client, wherein the client is configured to decrypt the encrypted result using a private key of the homomorphic encryption scheme.

19. A method for performing secure analytics using a homomorphic encryption, the method comprising:
receiving, by at least one server from a client, a term generation function, a hash function, a public key of a homomorphic encryption scheme, and a homomorphically encrypted list of indices, the term generation function including a Structured Query Language (SQL) processing engine, wherein generating the homomorphically encrypted list of indices includes:
extracting, using the term generation function, a set of terms from a query;
mapping, using the hash function, the terms in the set of terms to indices in a list of indices; and
encrypting, using the public key, the indices in the list;
applying, by the at least one server, the term generation function and the hash function to a data set to determine a further homomorphically encrypted list of indices and a homomorphically encrypted data set;
extracting, by the at least one server and using the homomorphically encrypted list of indices and the further homomorphically encrypted list of indices, data from the homomorphically encrypted data set to obtain an encrypted result; and sending, by the at least one server, the encrypted result to the client, wherein the client is configured to decrypt the encrypted result using a private key of the homomorphic encryption scheme.

20. A method for performing secure analytics using a homomorphic encryption, the method comprising:
receiving, by at least one server from a client, a term generation function, a hash function, a public key of a homomorphic encryption scheme, and a homomorphically encrypted list of indices, the term generation function including a machine learning model trained to generate a set of terms based on a query, wherein generating the homomorphically encrypted list of indices includes:
extracting, using the term generation function, the set of terms from the query;
mapping, using the hash function, the terms in the set of terms to indices in a list of indices; and
encrypting, using the public key, the indices in the list;
applying, by the at least one server, the term generation function and the hash function to a data set to determine a further homomorphically encrypted list of indices and a homomorphically encrypted data set;
extracting, by the at least one server and using the homomorphically encrypted list of indices and the further homomorphically encrypted list of indices, data from the homomorphically encrypted data set to obtain an encrypted result; and
sending, by the at least one server, the encrypted result to the client, wherein the client is configured to decrypt the encrypted result using a private key of the homomorphic encryption scheme.

21. A system for performing secure analytics using a homomorphic encryption, the system comprising:
at least one processor; and
a memory communicatively coupled with the at least one processor, the memory storing instructions, which when executed by the at least processor perform a method comprising:
receiving, by at least one server from a client, a term generation function, a hash function, a public key of a homomorphic encryption scheme, and a homomorphically encrypted list of indices, the term generation function including a Structured Query Language (SQL) processing engine, wherein generating the homomorphically encrypted list of indices includes:
extracting, using the term generation function, a set of terms from a query;
mapping, using the hash function, the terms in the set of terms to indices in a list of indices; and
encrypting, using the public key, the indices in the list;
applying, by the at least one server, the term generation function, the hash function, and the public key to a data set to determine a further homomorphically encrypted list of indices and a homomorphically encrypted data set;
extracting, by the at least one server and using the homomorphically encrypted list of indices and the further homomorphically encrypted list of indices, data from the homomorphically encrypted data set to obtain an encrypted result; and
sending, by the at least one server, the encrypted result to the client, wherein the client is configured to decrypt the encrypted result using a private key of the homomorphic encryption scheme.

22. A system for performing secure analytics using a homomorphic encryption, the system comprising:
at least one processor; and
a memory communicatively coupled with the at least one processor, the memory storing instructions, which when executed by the at least processor perform a method comprising:
receiving, by at least one server from a client, a term generation function, a hash function, a public key of a homomorphic encryption scheme, and a homomorphically encrypted list of indices, the term generation function including a machine learning model trained to generate a set of terms based on a query, wherein generating the homomorphically encrypted list of indices includes:
extracting, using the term generation function, the set of terms from the query;
mapping, using the hash function, the terms in the set of terms to indices in a list of indices; and
encrypting, using the public key, the indices in the list;
applying, by the at least one server, the term generation function, the hash function, and the public key to a data set to determine a further homomorphically encrypted list of indices and a homomorphically encrypted data set;
extracting, by the at least one server and using the homomorphically encrypted list of indices and the further homomorphically encrypted list of indices, data from the homomorphically encrypted data set to obtain an encrypted result; and
sending, by the at least one server, the encrypted result to the client, wherein the client is configured to decrypt the encrypted result using a private key of the homomorphic encryption scheme.

23. A non-transitory computer-readable storage medium having embodied thereon instructions, which when executed by at least one processor, perform steps of a method, the method comprising:
receiving, by at least one server from a client, a term generation function, a hash function, a public key of a homomorphic encryption scheme, and a homomorphically encrypted list of indices, the term generation function including a Structured Query Language (SQL) processing engine, wherein generating the homomorphically encrypted list of indices includes:
extracting, using the term generation function, a set of terms from a query;
mapping, using the hash function, the terms in the set of terms to indices in a list of indices; and
encrypting, using the public key, the indices in the list;
applying, by the at least one server, the term generation function, the hash function, and the public key to a data set to determine a further list of indices and a homomorphically encrypted data set;
extracting, by the at least one server and using the homomorphically encrypted list of indices and the further homomorphically encrypted list of indices, data from the homomorphically encrypted data set to obtain an encrypted result; and
sending, by the at least one server, the encrypted result to the client, wherein the client is configured to decrypt the encrypted result using a private key of the homomorphic encryption scheme.

24. A non-transitory computer-readable storage medium having embodied thereon instructions, which when executed by at least one processor, perform steps of a method, the method comprising:
receiving, by at least one server from a client, a term generation function, a hash function, a public key of a homomorphic encryption scheme, and a homomorphically encrypted list of indices, the term generation function including a machine learning model trained to generate a set of terms based on a query, wherein generating the homomorphically encrypted list of indices includes:
- extracting, using the term generation function, the set of terms from the query;
- mapping, using the hash function, the terms in the set of terms to indices in a list of indices; and
- encrypting, using the public key, the indices in the list;

applying, by the at least one server, the term generation function, the hash function, and the public key to a data set to determine a further list of indices and a homomorphically encrypted data set;

extracting, by the at least one server and using the homomorphically encrypted list of indices and the further homomorphically encrypted list of indices, data from the homomorphically encrypted data set to obtain an encrypted result; and sending, by the at least one server, the encrypted result to the client, wherein the client is configured to decrypt the encrypted result using a private key of the homomorphic encryption scheme.

* * * * *